(12) United States Patent
Coates et al.

(10) Patent No.: US 9,546,439 B2
(45) Date of Patent: Jan. 17, 2017

(54) PROCESS OF MAKING SHORT FIBER NONWOVEN MOLDED ARTICLES

(71) Applicant: Zephyros, Inc., Romeo, MI (US)

(72) Inventors: Michael William Coates, Glen Iris (AU); Philip John Gibbons, Hughesdale (AU); John Cain, Dandenong South (AU)

(73) Assignee: ZEPHYROS, INC., Romeo, MI (US)

( * ) Notice: Subject to any disclaimer, the term of this patent is extended or adjusted under 35 U.S.C. 154(b) by 63 days.

(21) Appl. No.: 14/277,953

(22) Filed: May 15, 2014

(65) Prior Publication Data

US 2015/0330001 A1    Nov. 19, 2015

(51) Int. Cl.

| | |
|---|---|
| B29C 37/02 | (2006.01) |
| B32B 5/26 | (2006.01) |
| B32B 37/04 | (2006.01) |
| D04H 1/58 | (2012.01) |
| D04H 1/593 | (2012.01) |
| D04H 1/70 | (2012.01) |
| D04H 1/4274 | (2012.01) |
| D04H 1/558 | (2012.01) |
| D04H 1/559 | (2012.01) |
| B29C 69/00 | (2006.01) |

(Continued)

(52) U.S. Cl.
CPC ........... *D04H 1/4274* (2013.01); *B29C 69/001* (2013.01); *B32B 5/022* (2013.01); *D04H 1/54* (2013.01); *D04H 1/5405* (2013.01); *D04H 1/558* (2013.01); *D04H 1/559* (2013.01); *D04H 1/732* (2013.01)

(58) Field of Classification Search
CPC ........ B29C 37/02; B29C 69/001; B32B 5/022; B32B 5/26; B32B 37/04; D04H 1/4274; D04H 1/54; D04H 1/559; D04H 1/58; D04H 1/593; D04H 1/70
USPC ............. 264/37.28, 103, 112, 115, 116, 123, 125,264/126, 161, 913; 156/62.2, 62.4
See application file for complete search history.

(56) References Cited

U.S. PATENT DOCUMENTS

| | | |
|---|---|---|
| 3,061,491 A | 10/1962 | Sherrard |
| 3,087,571 A | 4/1963 | Kerwin, Jr. |

(Continued)

FOREIGN PATENT DOCUMENTS

| | | |
|---|---|---|
| DE | 6930307 U | 12/1969 |
| DE | 19714348 | 10/1998 |

(Continued)

OTHER PUBLICATIONS

Chinese Office Action dated Feb. 4, 2014; Application No. CN200980156115.7.

(Continued)

*Primary Examiner* — Leo B Tentoni
(74) *Attorney, Agent, or Firm* — The Dobrusin Law Firm, P.C.

(57) ABSTRACT

A method of forming a nonwoven article comprising receiving fibrous material comprising thermoplastic fibers; processing the fibrous material to produce short fibers, wherein the processing step comprises granulation using at least one granulator with a screen; distributing the short fibers approximately evenly across an area to form a short fiber web, wherein the distributing step comprises a use of a recyclate spreader; heating the short fiber web to fuse the short fibers to form a nonwoven material; and forming a sheet of the nonwoven material.

20 Claims, 3 Drawing Sheets

(51) Int. Cl.
   *B32B 5/02*  (2006.01)
   *D04H 1/54*  (2012.01)
   *D04H 1/732* (2012.01)

(56) References Cited

U.S. PATENT DOCUMENTS

| | | | |
|---|---|---|---|
| 3,160,549 A | 12/1964 | Caldwell | |
| 3,193,049 A | 7/1965 | Wollek | |
| 3,205,972 A | 9/1965 | Stricker | |
| 3,386,527 A | 6/1968 | Daubert | |
| 3,642,554 A * | 2/1972 | Hensley | 156/62.2 X |
| 3,978,179 A | 8/1976 | Sundhauss | |
| 4,287,255 A | 9/1981 | Wong et al. | |
| 4,299,223 A | 11/1981 | Cronkrite | |
| 4,705,715 A | 11/1987 | DeCoste et al. | |
| 4,988,551 A | 1/1991 | Zegler | |
| 5,004,579 A * | 4/1991 | Wislinski | D04H 1/70 264/112 |
| 5,128,386 A | 7/1992 | Rehmer et al. | |
| 5,401,567 A | 3/1995 | Knobloch | |
| 5,496,603 A | 3/1996 | Riedel et al. | |
| 5,613,942 A | 3/1997 | Lucast et al. | |
| 5,741,829 A | 4/1998 | Reich et al. | |
| 5,747,131 A | 5/1998 | Kreckel | |
| 5,773,080 A | 6/1998 | Simmons et al. | |
| 6,238,761 B1 | 5/2001 | Jeong et al. | |
| 6,376,396 B1 | 4/2002 | Thorn et al. | |
| 6,378,179 B1 | 4/2002 | Hirsch | |
| 6,913,718 B2 * | 7/2005 | Ducker | A61F 13/15723 264/37.28 X |
| 7,470,339 B2 | 12/2008 | Hoffmann et al. | |
| 7,514,026 B1 | 4/2009 | Zafiroglu | |
| 7,757,810 B2 | 7/2010 | Sparks et al. | |
| 7,757,811 B2 | 7/2010 | Fox et al. | |
| 7,867,601 B2 | 1/2011 | Ikishima et al. | |
| 8,365,862 B2 | 2/2013 | Coates et al. | |
| 8,534,419 B2 | 9/2013 | Coates et al. | |
| 2003/0068943 A1 | 4/2003 | Fay | |
| 2004/0021247 A1* | 2/2004 | Habisreitinger | B29C 70/467 264/161 |
| 2004/0111817 A1 | 6/2004 | Chen et al. | |
| 2004/0176003 A1 | 9/2004 | Yang et al. | |
| 2004/0180177 A1 | 9/2004 | Ray et al. | |
| 2004/0180592 A1 | 9/2004 | Ray | |
| 2004/0238275 A1 | 12/2004 | Keller et al. | |
| 2006/0090958 A1 | 5/2006 | Coates et al. | |
| 2006/0105664 A1 | 5/2006 | Zafiroglu | |
| 2006/0137799 A1 | 6/2006 | Haque et al. | |
| 2006/0289230 A1 | 12/2006 | Connelly et al. | |
| 2006/0289231 A1 | 12/2006 | Priebe et al. | |
| 2007/0277948 A1 | 12/2007 | Carbo et al. | |
| 2008/0001431 A1 | 1/2008 | Thompson et al. | |
| 2008/0050565 A1 | 2/2008 | Gross et al. | |
| 2008/0064794 A1 | 3/2008 | Murdock et al. | |
| 2008/0166940 A1 | 7/2008 | Nunn et al. | |
| 2008/0233348 A1 | 9/2008 | Ishiwatari et al. | |
| 2008/0251187 A1 | 10/2008 | Haque et al. | |
| 2009/0148644 A1 | 6/2009 | Francis | |
| 2009/0162595 A1 | 6/2009 | Ko et al. | |
| 2009/0255619 A1 | 10/2009 | Tong | |
| 2010/0168286 A1 | 7/2010 | Gladfelter et al. | |
| 2011/0070794 A1 | 3/2011 | Gladfelter | |
| 2011/0082386 A1 | 4/2011 | Sheraton, Sr. | |
| 2011/0274921 A1* | 11/2011 | Li et al. | 428/354 |
| 2011/0293911 A1 | 12/2011 | Coates et al. | |
| 2012/0058289 A1 | 3/2012 | Coates et al. | |
| 2013/0192921 A1 | 8/2013 | Coates et al. | |

FOREIGN PATENT DOCUMENTS

| | | |
|---|---|---|
| GB | 823203 | 11/1959 |
| GB | 2079626 | 1/1982 |
| JP | 60-137528 | 9/1985 |
| JP | H05-113020 | 7/1993 |
| JP | H8-223855 | 8/1996 |
| JP | H10-156994 | 6/1998 |
| JP | H10-273900 | 10/1998 |
| JP | H10-280259 | 10/1998 |
| JP | 2000-310023 | 7/2000 |
| JP | 2004-107605 | 8/2004 |
| JP | 2005-036364 | 2/2005 |
| JP | 2005-076144 | 3/2005 |
| JP | 2006/193838 | 7/2006 |
| JP | 2007-512990 | 5/2007 |
| JP | 2007-223273 | 6/2007 |
| JP | 2008/068799 | 3/2008 |
| WO | 00/32142 | 6/2000 |
| WO | 01/19306 | 3/2001 |
| WO | 03/000976 A1 | 1/2003 |
| WO | 2005/081226 A1 | 9/2005 |
| WO | 2006/107847 A2 | 10/2006 |
| WO | 2010/042995 | 4/2010 |
| WO | 2010/063079 A1 | 6/2010 |

OTHER PUBLICATIONS

Chinese Second Office Action dated Jul. 10, 2013; Application No. CN200980156115.7.
European Office Action dated Oct. 15, 2013; Application No. 09829894.6.
European Office Action dated Oct. 19, 2012; Application No. 09829894.6.
Japanese Office Action dated Jul. 25, 2013; Application No. 2011-538800.
Japanese Office Action dated Apr. 11, 2014; Application No. 2011-538800.
Japanese Office Action dated Dec. 17, 2013; Application No. 2011-531302.
Australian Office Action dated Sep. 23, 2014, Application No. 2009322091.
International Search Report, mailed Dec. 2, 2009, for PCT/AU2009/001363, 4 pages.
DECI-TEX 3D, URL = http://web.archive.org/web/20070830042658 http://www.inccorp.com.an/page/deci_tex_3d.html#top, including nine (9) documents from links therein, download date Aug. 26, 2011, 19 pages.
International Search Report amd the Written Opinion of the International Searching Authority for Application No. PCT/US2015/30742, Dated Aug. 19, 2015.

* cited by examiner

PROCESS OF MAKING SHORT FIBER NONWOVEN MOLDED ARTICLES

FIELD

The present teachings relate generally to methods of forming short fiber nonwoven molded articles and the recycling of waste materials to form subsequent short fiber nonwoven molded articles.

BACKGROUND

Nonwoven articles may be formed from a variety of fibrous materials and can vary substantially in form and density. Such materials can be used in a variety of applications, including filtration, battery separation, and sound absorption. High density, porous, nonwoven textiles can be used as a fiber board.

Previously, there were limited ways to improve sound absorption capability of fiber-based acoustic materials. One way to change air flow resistance, and in turn, change sound absorption, is by using short fibers. However, the use of short fibers has been limited because of a lack of ability to effectively process the short fibers, prevent clumping of the fibers due to static electricity, and produce a stable, useful nonwoven web. Prior short fiber processing technologies have been found to produce products that are fragile, easily broken or degraded.

Nonwoven articles, including short fiber-based articles, can be formed into rolls or sheets and can be converted by lamination, coating, molding, stamping, cutting, or can be otherwise fabricated into desired shapes and sizes. In certain applications, nonwoven textiles are molded into three-dimensional shapes for a variety of functional applications.

During the processing and shaping of nonwoven articles, a large amount of waste can be generated. Waste can include the by-products of a process, the portions that are not part of the molded article, the offal, scrapped or flawed parts, the trimmed matrix after die-cutting, and the like. A large proportion of this waste is generated in the form of the trimmed matrix from molded fibrous sheets. It is estimated that about 50% of a sheet that is used to make a molded part goes to waste upon cutting or removing molded parts, thereby creating a material inefficiency.

There is, thus, a need to develop a process that creates a stable, useful nonwoven web from short fibers that can be used to form a nonwoven article. Furthermore, there is a need for a process where the waste can be recycled and used for subsequent parts to reduce waste and costs.

SUMMARY

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

Some Illustrations of the teachings relate to methods of forming a nonwoven molded article from short fibers, comprising, at least in part, recycled fibers. Alternatively, some embodiments relate to methods of forming a nonwoven molded article from short fibers, wherein the methods use virgin stable fibers.

In one aspect, the present teachings pertain to a method of forming a nonwoven article comprising: receiving fibrous material comprising thermoplastic fibers; processing the fibrous material to produce short fibers, wherein the processing step comprises at least one granulator with a screen; distributing the short fibers approximately evenly across an area to form a short fiber web, wherein the distributing step comprises a recyclate spreader; heating the short fiber web to fuse the short fibers to form a nonwoven material; and forming a sheet of the nonwoven material.

This aspect may be further characterized by one or any combination of the following methods. The fibrous material may pass through a single shaft shredder in the processing step (e.g., for an initial size reduction). The processing step may also comprise two or more granulators arranged in series. Granulators may each have screens that decrease in size as the fibers pass through the process to get the short fibers to a desired average length. For example, the fibers in traditional nonwoven articles may be up to about 60 mm in length, or the short fibers may be reduced to an average fiber length of about 12 mm or less, about 2 mm to about 3 mm, or even smaller (e.g., close to a powder). The short fibers may be blended before they are distributed across an area to form the short fiber web. The short fibers may be distributed onto a facing material. The facing material may be formed from a preformed web, needle punched nonwoven material, or other nonwoven fabrics, for example. It is also possible that a second facing material can be placed on top of the short fiber web, so the short fiber web is sandwiched between two facing materials. The short fiber web and the facing material, if any, may be heated by a conveyor oven to soften the low melt temperature short fibers and bond the short fibers together. The short fiber web and facing material, if any, may be compacted to achieve a desired density, for example, by using a set of heated calender rolls.

In a further aspect, it is contemplated that the short fiber molded articles described herein may be formed from recycled waste material. For example, when a sheet is formed from the nonwoven material, the sheet can be molded or shaped into a molded article surrounded by waste (e.g., a portion of the material not used to form the molded article). This waste may be separated from the molded article, for example, as a result of conversion, stamping, or any waste trimming system, such as water-jet, laser or knife cutter. Then the waste may be recycled into the receiving step and reprocessed in the processing step. Therefore, the waste may be reused to create short fibers for subsequent short fiber nonwoven articles. Waste may also include scrapped parts, such as those that are unfit for use due to manufacturing faults or that fail to meet specifications.

In embodiments where the short fiber layer is not compressed, a low density nonwoven acoustic material, such as a porous bulk absorber, which may be defined as a permeable material comprising many small diameter fibers often bonded to each other to lend some structural integrity, may be produced. In embodiments where the short fiber layer is compressed, depending upon the extent of the compression, a high density nonwoven acoustic material, such as an air flow resistive sheet or porous limp sheet, may be produced. Such sheets are described in detail in "Notes on Sound Absorption Technology" by Professor K. Uno Ingard.

Employing the described methods may form nonwoven materials. Some of these nonwoven materials may be suitable for use as sound absorption materials and may relate to acoustic sheets. Some of these materials may be suitable for use as filtration materials, pin boards, structural boards, separation materials, or the like.

A low density nonwoven material may be combined with a high density nonwoven material to form a composite material with desirable properties. For example, a composite acoustic product may include a porous limp sheet with a relatively high air flow resistance and a layer of porous bulk absorber attached to one side of the sheet having an air flow resistance substantially lower than the sheet. One or both of the porous limp sheet and the porous bulk absorber may comprise short fibers in accordance with the teachings described herein. Air flow resistance is a measure of how difficult it is for air to mass through a material, and it is calculated in Rayls. The composite acoustic product may exhibit locally reactive acoustic behavior and an overall air flow resistance desirable for acoustic products. It is possible to achieve a useful product with an air flow resistance of about 100 Rayls or greater. It is also possible to achieve a useful product with an air flow resistance of about 1000 Rayls or greater. In some illustrations, the air flow resistance may be about 10,000 Rayls or less. It is contemplated that the products formed using one or more of the methods described herein may have an air flow resistance that falls within a desired range, such as, for example, a range from about 2800 Rayls to about 8000 Rayls (e.g., at least about 2800 Rayls and less than about 8000 Rayls).

The nonwoven material of certain embodiments may have a selected air flow resistivity, which is the air flow resistance divided by the material thickness. The selected air flow resistivity may be substantially higher than the air flow resistivity of a conventional nonwoven material comprising substantially conventional staple fibers. For example, conventional staple fibers may have a longer length than fibers disclosed herein (e.g., from about 30 mm to about 100 mm). In some embodiments, the selected air flow resistivity achieved in a nonwoven material comprising short fibers of a certain diameter and composition may be about three times greater than that of a conventional nonwoven material produced using longer fibers of the same diameter and composition. This increase in air flow resistivity with decreasing fiber length is unexpected based upon current acoustic theory. A low density nonwoven material may have a thickness of about 1.5 mm to about 350 mm, though greater and/or smaller thicknesses are also possible. The low density nonwoven material may exhibit an air flow resistivity in a range of about 400 Rayls/m to about 275,000 Rayls/m. A high density nonwoven material may have a thickness of about 0.1 mm to about 5 mm or more. The high density nonwoven material may exhibit an air flow resistivity of about 257,000 Rayls/m to about 3,000,000 Rayls/m.

The area across which the short fibers are distributed may comprise a surface, such as a conveyor, that does not form part of the nonwoven material, but supports the precursor web during the bonding process. Alternatively or additionally, the area may comprise a preformed web which may be sacrificial or integral with the nonwoven material. In such embodiments, the short fibers may be distributed within and/or on top of the preformed web. Accordingly, the short fibers may be used to modify the air flow resistance of the preformed web to achieve a nonwoven material having desirable properties.

The fibrous material may include thermoplastic fibers or bicomponent fibers having an adhesive thermoplastic component. Accordingly, the bonding of at least some of the short fibers may be affected by heating the precursor web to a temperature at which the thermoplastic polymer in the short fibers will at least partially soften or melt. The softened or molten thermoplastic can be used to bond together at least some of the short fibers and form the nonwoven material. Thus, bonding may include adhering the short fibers to the softened thermoplastic so that the fibers become fused to the thermoplastic as the heated material cools.

The fibrous material may comprise multiple thermoplastic polymers. The multiple thermoplastic polymers may have the same or differing melting points (e.g., having high and/or low melting points). Where the thermoplastic polymers have differing melting points, the fibrous material may be heated only to a temperature at which any thermoplastic polymer having a low or lower melting point softens and melts. Thus, any thermoplastic polymer having the low or lower melting point may be used to bond together the nonwoven material, while any thermoplastic polymer having a higher melting point remains substantially intact. In some embodiments, the low melting point thermoplastic polymer may be present in a different fiber than the higher melting point thermoplastic polymer. In some other embodiments, the high and low melting point polymers may form different components of a bicomponent fiber.

At least some of the short fibers may be bonded together using an additional adhesive component. A variety of materials may be used as the adhesive component in accordance with embodiments of the nonwoven material. The adhesive component may be a thermoplastic or thermoset resin or binder. The adhesive component may be in the form of a powder. The adhesive component may comprise thermoplastic fibers, such as thermoplastic staple fibers, that are combined with the short fibers prior to forming the precursor web. The adhesive component may comprise a preformed web of thermoplastic fibers onto and/or into which the short fibers are distributed to form the precursor web.

Any or a combination of the above teachings of the adhesive component may be used in the nonwoven material. For example, the adhesive component may comprise a thermoplastic resin powder in combination with thermoplastic fibers. Furthermore, the adhesive component may be used in combination with short thermoplastic fibers or short bicomponent fibers having an adhesive thermoplastic component formed from the fibrous material in order to bond together at least some of the short fibers of the precursor web.

DESCRIPTION OF THE DRAWINGS

Embodiments are described in further detail below, by way of example, with reference to the accompanying drawings.

DETAILED DESCRIPTION

Figure 1:
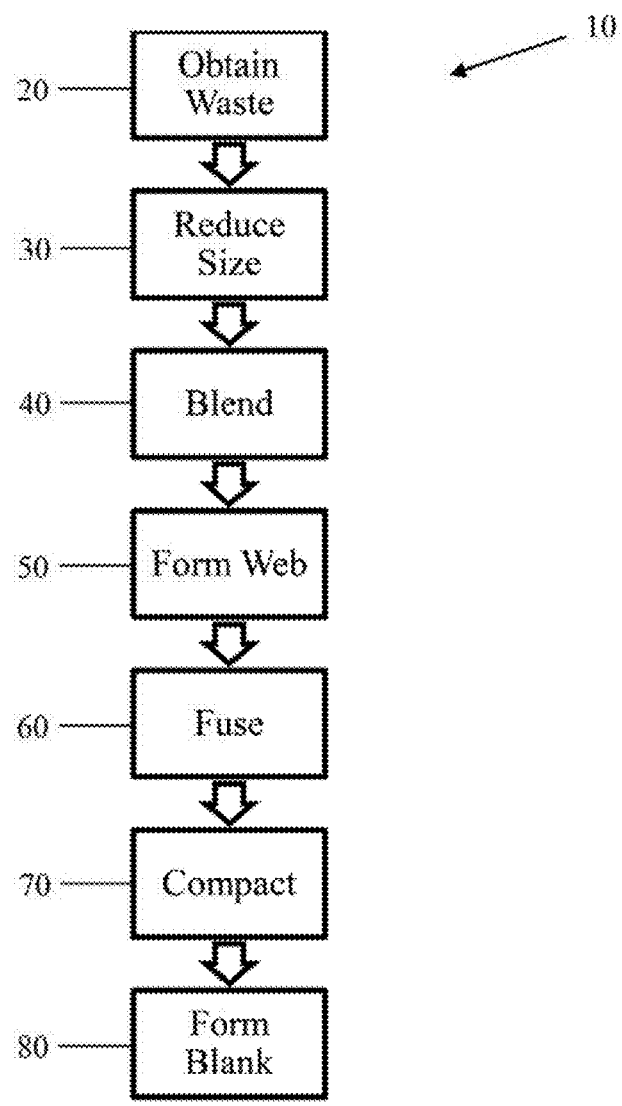
FIG. 1 is a flowchart illustrating general steps of a method of forming an acoustic sheet.

Some described embodiments relate generally to methods of forming a nonwoven material, such as a thermoformable short fiber nonwoven (TSFNW) material, comprising at least some short fibers formed largely from recycled waste material, and to the nonwoven materials formed thereby. Some embodiments relate to the bulk recycled short fiber material. Further embodiments relate generally to methods of forming a nonwoven material comprising short fibers formed from virgin staple fibers, and to the nonwoven materials formed thereby.

In the context of the present application, the term "thermoformable short fiber nonwoven" as used herein, is intended to indicate a nonwoven material that may be formed with a broad range of densities and thicknesses and that contains a thermoplastic and/or thermoset binder. The TSFNW material may be heated and thermoformed into a specifically shaped "thermoformed product".

The use of short fibers may be advantageous in thermoformable materials due to the inherent "thermal memory" of fibrous materials. During processing, fibers may be heated in order to conform them to the desired geometry for the nonwoven material. However, when the material is reheated, such as during use, the fibers may distort and revert to a geometry closer to the one they had prior to initial processing as a result of the fibers' "thermal memory". In longer fibers, such as conventional staple fibers, the overall displacement that may occur due to thermal memory distortion is larger than that of shorter fibers, as the tendency to revert and distort is a function of the fiber's length. Accordingly, a TSFNW material may have greater temperature stability than a nonwoven material using fibers having a longer length.

TSFNW materials may require less binder than similar materials having longer fibers therein. In materials having longer fibers, additional binder materials may be needed to mitigate the effects of thermal memory distortion by constraining the fibers in the desired geometry. Thus, short fiber-based materials may require less binder because comparatively less thermal memory displacement occurs in shorter fibers. Accordingly, TSFNW materials in accordance with the teachings herein may require less binder to achieve a desired product geometry when compared to thermoformable nonwoven materials comprising long fibers. The TSFNW materials may also be more lightweight than nonwoven materials formed of fibers having a long length. In addition, thermoforming of TSFNW materials may be performed more efficiently as compared to long fibers, as less material may have to be heated. As a result, less energy may be required to heat the material to the temperature necessary for thermoforming.

Fibrous waste material used to generate the short recycled fibers may be obtained from a wide variety of sources. The waste material may be formed by a process of creating other nonwoven products, for example as a result of conversion, stamping, cutting, and the like. Waste can include the by-products of a process, the portions that are not part of a molded article, the offal, scrapped or flawed parts, the trimmed matrix after die-cutting, the like, or combination thereof. In some cases, particularly in the early stages of a manufacturing process, the waste material consists of only or mostly fibers. Thus, the waste may be very similar in quality to virgin staple fibers. In particular, 100% fibrous waste will be free of non-fibrous binders, such as adhesive powders, and films that may influence the character of the bulk short fiber recyclate. This material can be considered simple fibrous waste material. Alternatively, the fibrous waste material may comprise additional components, possibly because the waste is produced during later stages of a manufacturing process. As a result, the waste material may constitute a complex fibrous waste material. In some embodiments, the complex fibrous material may be post-consumer, or post-industrial, waste.

In some embodiments, the waste material may result from a conversion process, including but not limited to laminating, coating, molding, trimming, and/or cutting, or other sources of waste fabrics or fibers. For example, when thermoformable acoustic sheet materials are molded, a large percentage of the material—the material cut away from the molded part, or waste—ends up as waste. In some applications, about 50% is typical. Previously, the waste was not able to be recycled, or it was thought that the waste would have to undergo melting or disambiguation steps to recover any of the component parts to be reused. However, with the methods disclosed herein, waste material can be reused in subsequent processes creating short fiber nonwoven molded articles without such melting or disambiguation steps.

In view of the wide range of sources of fibrous material that can be utilized in the processes described herein, a wide range of fiber thicknesses or linear densities can be used in various embodiments. Fibers may have a low thickness (or linear density), such as below 2 denier. Fibers may have a moderate thickness (or linear density), such as 2 to 12 denier. Fibers may have a coarse thickness (or linear density), such as that found in carpet fibers and in some industrial textiles. In general, the fiber diameter is selected based upon the desired properties of the nonwoven material produced using the short fibers. For example, the fiber diameter may be selected based upon the desired air flow resistance or air flow resistivity of the resulting material, where air flow resistance is the air pressure difference across the material divided by the volume velocity of air flow through the material, and the air flow resistivity is the air flow resistance divided by the thickness of the material.

Fibrous waste material may be processed to produce short fibers by shredding the waste. For example, instead of or in addition to using traditional textile recycling equipment, the process can employ a single shaft shredder. The single shaft shredder may make a first rough size reduction if used at or near the beginning of the process. A single shaft shredder is advantageous because it is capable of processing large parts, for example, parts with a surface area greater than one square meter, and/or parts that are highly compacted.

Fiber size can be reduced by granulation. At least one granulator may be used. It is contemplated that two or more granulators can be used in series. A granulator has a cutting chamber with fixed and rotating blades, and there is a screen at the bottom that allows material to pass through once it has become small enough. If two or more granulators are used in series, the first granulator may have a larger screen and subsequent granulators may have smaller screens (e.g., screens having smaller openings than any previous screen). By varying the screen size, the preferred length of fiber may be obtained. As the material exits the final granulator, it is contemplated that the end result may be a powder-like consistency, where the average fiber length is about 2 mm to about 3 mm. Alternatively, some or all of the fibrous waste material can be substituted by virgin staple fibers to produce short virgin fibers using the same process.

The selection of the screen size may depend, though not limiting, on the nature of the fibrous waste material and/or virgin staple fibers, the desired mechanical and physical properties (such as air flow properties) of the nonwoven material, the nature of the fibers, the proportion of adhesive materials that may be added (e.g., added post-granulation), the like, or any combination thereof. In circumstances where the fibrous waste material contains only short recycled fibers (e.g., substantially free of any adhesives, binders, films or melted thermoplastic materials), the outcome of any screening may be quite predictable, except as noted below.

A matrix of a desired mechanical or physical property, such as air flow permeability, fiber size and length, and adhesive content may provide predictable results. However, where other components, such as films, adhesives, binders, or post-melt thermoplastic materials are present in the fibrous waste material, the material may have to be characterized to determine the process conditions for a predictable outcome. Once the material is characterized, achieving the desired air flow properties may be predictable but may be much more dependent upon the screen size than where the fibrous waste material contains only short recycled fibers. In general, if the screen is too coarse (e.g., the openings in the screen are too large), the resulting screened material may not be suitable.

In some illustrations of the present teachings, the short recycled fibers will have a fibrous character similar to virgin staple fibers. In other illustrations of the present teachings, for example, if the fibrous waste material is high density and/or includes a high proportion of binder (or other non-fiber material), the short recycled fibers may have a granular or particulate structure comprising clumped or grouped fibers or both, which may be in some way bound or adhered to each other.

For complex fibrous waste material, careful selection of the screen may be required in circumstances where the nonwoven material must have controlled air permeability, for example, in applications for acoustic materials, filters or battery separators. For applications in which the control of air flow permeability is less important, for example in a spacer layer or a semi-structural panel, a wider range of screens (e.g., screens having a wide range of opening sizes) may be suitable for use.

The fibrous waste materials from which the short fibers are formed may include laminated facings and backings, such as foils, films, foam layers, fabric, pressure sensitive layers, hot melt adhesive layers, the like, or combination thereof. These layers, which may normally be incompatible with conventional recycling processes, may be converted into small pieces in the size reduction process. The small pieces may act as fillers that can assist to reduce porosity and increase tortuosity, which may be desirable where a high air flow resistance is desired. If thermoplastic in nature, these small pieces can act as an adhesive for a subsequently formed fiber web.

The final form of the processed material is generally described herein for convenience as short fiber recyclate (SFR). The SFR may comprise 100% short fibers from the size reduction process, or possibly a lesser proportion of these short fibers. The short fibers may optionally be blended, or otherwise combined, with suitable additives such as, without limitation, other forms of recycled waste, virgin (non-recycled) materials, mineral fillers, thermoset resins, coloring agents, flame retardants, longer staple fibers, the like, or combination thereof to form a mixed short fiber recyclate, (MSFR). This blending allows for different recyclate streams to be processed individually before being combined. Long staple fibers in the range of, for example, about 30 to 100 mm in length, alternatively about 51 mm average length, alternatively about 64 mm average length, that are relatively long compared to the short fibers of waste material may be added to form the MSFR. These long staple fibers may be added as a reinforcement to improve, for example, one or more of the following: the tensile strength, bending strength, or impact resistance of the nonwoven material.

In forming MSFR, suitable non-fiber waste streams may be added to act as filler and/or as adhesive. Additives may be added to the recycled fibers to impart desired properties, such as, but not limited to, fire retardancy, tear resistance, improved air permeability or increased mass. Where control of physical properties is important, the waste stream should be derived from known sources, with known constituents. For convenience, within the context of this description, SFR should be interpreted as also including the mixed short fiber recyclate (MSFR).

At least some of the materials used to form the SFR may comprise thermoplastic materials, such as polyethylene terephthalate (PET), various co-polyester materials (Co-PET), polypropylene (PP), polyethylene (PE), polyamide (PA), ethylene vinyl acetate (EVA), or combinations thereof. The SFR material may comprise other man-made fiber that does not exhibit thermoplastic behavior, such as poly aramid fibers, meta aramid fibers, or blends of such fibers. The SFR may further comprise a proportion of natural fibers such as cotton, wool, hemp, combinations thereof and the like. The proportion of natural fibers used in producing the SFR may be dependent upon the desired application of the SFR nonwoven material. For example, in some embodiments a proportion of wool may be included in the SFR to impart flame retardant properties to the SFR nonwoven material, for example about 20 wt. % or more of the total mass of the SFR. In some embodiments, it may be desirable to include up to 90 wt. % of natural fibers in the SFR. The SFR nonwoven material formed using a high proportion of natural fibers may be used as a carpet underlay or pin board material, for example. The material may contain adhesive thermoplastic fibers. The melting point of the thermoplastic fiber component may be lower than the melting point of another fiber components in the waste stream.

SFR material generated from recycled waste material of thermally bonded nonwoven insulation, for example, generally includes adhesive binder fibers and higher melting point thermoplastic fibers, non-thermoplastic man-made fibers, or natural fibers. SFR material generated from conventional textile waste, for example, generally does not include adhesive binder fibers. SFR material generated from low temperature melting fibers, such as PP, may perform the function of an adhesive binder if thermal bonding is conducted above the melting point of such fibers. Accordingly, depending on the type of waste material, it may be necessary to intimately mix the SFR with an additional thermoplastic binder or other binding component to achieve desired levels of bonding. Alternatively or additionally, another adhesive component, such as a thermoset resin, may be combined with SFR during production of the nonwoven material.

In embodiments using short fibers that are not thermoplastic in character, such as wool, a thermoplastic binder may be added to the SFR and/or the precursor web of SFR, for example in the form of a powder or fibers. The thermoplastic fibers may also be short fibers that are optionally recycled. Greater proportions of thermoplastic binder may be added to the SFR to produce nonwoven materials having smaller pores and fewer voids within the material. As the proportion of binder increases and the void spaces within the material reduce further, the material produced may become more like a short fiber reinforced plastic sheet than a nonwoven textile.

In some embodiments, plasticized polyvinyl chloride (PVC) or thermoplastic polyurethane (PU) may be used as the thermoplastic binder to produce a nonwoven material having PVC- or PU-coated fibers. The source of the PVC or PU may be the fibrous material used to produce the SFR. In some embodiments, the PVC or PU may be from backings or binders included with the fibrous waste. Alternatively or additionally, the PVC or PU may be added as a separate additive to the SFR.

An auger may be used to convey the SFR to a recyclate spreader before the fibers are put into a conveyor oven. Since small fibers tend not to flow easily and static charge may cause the fibers to clump and interfere with manufacturing equipment, a recyclate spreader may be used to deposit the SFR onto a carrier to transport the fibers into a conveyor oven. To have a consistent product, it is recommended that the recyclate is spread with a generally consistent weight per unit area onto the facing material that allows the recyclate to be conveyed.

In some embodiments, the SFR may be scattered on, or otherwise incorporated into, a preformed fibrous web, and subsequently bonded, usually through heating, to form a nonwoven material. The nonwoven material may comprise about 5% or greater and less than 100% by weight of recycled fibers. For example, the nonwoven material may comprise between about 5% and about 95%, 96%, 97%, 98% or 99% by weight of recycled fibers. Alternatively, the nonwoven material may comprise about 20% or greater and less than about 80% by weight of recycled fibers. Alternatively, it may comprise about 30% or greater and less than about 60% by weight of recycled fibers. Additives may be added to the recycled fibers before, or during, the scattering or spreading application. Additives may also be added to the SFR by the use of additional scattering or spreading units set up in series with the spreading of the SFR.

The preformed fibrous web may comprise staple fibers in the length range of about 30 to 100 mm, for example, that are relatively long compared to the reduced-size short fibers of waste material. For example, such a web may be a preformed thermally bonded web consisting of PET fibers, with a sheath/core type bicomponent binder fiber having a PET core surrounded by a lower melting point co-polyester (CoPET) sheath that melts at a lower melting point than the PET fiber. Nominally, this lower melting point may be approximately 110° C. However, other melting point CoPET polymers can also be used. The bicomponent fibers may alternatively comprise other polymer types, such as PE/PET, PP/PET, PA/PET, or combinations thereof.

The SFR may be formed as a fibrous web onto a pre-manufactured nonwoven web, such as a spunbond, airlaid, melt-blown, wet-laid, spun-laced, hydro-entangled, needle-punched, or similar nonwoven web, for example, such that the SFR forms a coating on the nonwoven web. The weight and density of the preformed web can be selected based on the mechanical and physical properties required from the final sheet. For example, the web may only have sufficient tensile and tear strength so that it is suitable to act only as a carrier for the recycled short fibers. Alternatively, the tear and tensile strength of the final nonwoven material may be largely afforded by the preformed web.

The SFR may be formed as a fibrous web onto a pre-manufactured low density nonwoven material such as, for example, a porous bulk absorber to form a composite material with variable air flow resistivity through the thickness of the material. However, following heating and compression to consolidate the SFR web, the nonwoven material including the pre-manufactured low density preformed web may be converted into a high density nonwoven material, such as, for example a porous limp sheet. The porous limp sheet formed may be utilized together with another porous bulk absorber, which may or may not be in accordance with the other embodiments described herein, to also form a composite product. In embodiments where the bulk absorber and the limp sheet are both TSFNW materials, the composite material may also be thermoformable. In some embodiments, the porous bulk absorber may be attached to one side of the porous limp sheet during molding and thermoforming. In another embodiment, the porous bulk absorber may be attached to one side of the limp sheet prior to molding. The porous bulk absorber may also be applied to more than one side of the limp sheet.

In some embodiments, the SFR may be formed as a web onto a pre-manufactured woven or knitted textile web, such that the SFR forms a coating on that web. For example, the web may comprise an upholstery or decorative fabric, so that the nonwoven material so produced is aesthetically pleasing and suitable for use in an automotive or architectural interior. In this way, the nonwoven material including the SFR can form part of a composite product.

The preformed web may be sacrificial. The SFR may be formed onto a thin, lightweight preformed web, such as a tissue material (e.g., a 13 gsm tissue). Once the SFR web has been consolidated, the sacrificial preformed web may be peeled off and discarded. The sacrificial web may be removed immediately after consolidation (e.g., compression) of the SFR web. Alternatively, the sacrificial web may only be removed just prior to the use of the SFR nonwoven material.

In some embodiments, the nonwoven material may be formed with a high proportion of SFR, potentially up to 100%, without a preformed web. These embodiments may be produced by forming the SFR into a web by air laying, mechanical web forming, scattering, or otherwise distributing, the SFR onto a forming belt. The SFR may be subsequently heated and compressed.

The SFR may be heated using one or more techniques including, for example, contact heating, exposure to heated vapor (e.g. steam) or gas (e.g. such as that used in through-air bonding) and exposure to infrared radiation. It is also contemplated that a conveyor oven could be used to heat the short fibers. In one embodiment, the SFR could contain bi-component fibers, low melt fibers, low melt temperature powder or granules, or some combination thereof, to allow the material to be fused together when heated. As the SFR is transported through the conveyor oven, the low melt temperature materials may soften to bond the short fiber material together. In this illustration, it may be beneficial to have a facing material beneath the SFR to transport the SFR through the conveyor oven. This facing material can include fabric such as needle punched material or other types of nonwoven materials, including scrims.

The forming belt may be a solid, non-stick or non-adhesive conveyor, which may be utilized to transport the material through a flat bed laminator or compression unit to produce a higher density nonwoven material. In some of these embodiments, the SFR may be blended with various additives, including other fibers such as long staple fibers. The forming belt may have an open mesh construction, and the SFR may then be passed through a through-air bonding oven to produce low density materials. The forming belt may be a solid, non-stick conveyor, for transport through a flat bed laminator or compression unit to produce a higher density nonwoven material.

In some embodiments, a second facing can be added to the top of the SFR. The second facing material can be of the compositions discussed above and may include fabric such as needle-punched nonwoven material. The facing materials may optionally be mechanically attached together, for example, by using a needle loom.

In some embodiments, the nonwoven material may pass through a combination of two or more processes, and may be laminated with various facings on one or both sides or compacted. Facings may include nonwoven materials having relatively high air flow resistance, such as porous limp sheets, in accordance with certain embodiments of the nonwoven material. A typical laminator may not have the capability of compressing the material sufficiently for production purposes, so it is contemplated that other methods of compaction, such as at least one set of heated calender rolls or a series of calender rolls, may be used. An exemplary set of calender rolls may be produced with 2 rolls, 3 rolls, or more. It is possible for the nonwoven material to pass through the calender rolls by "direct" passing, which is common in standard applications and light webs, or it is further contemplated that the material can pass through the calender rolls through an "S" sequence in order to give the maximum heating time.

A nonwoven material may be formed to have a thickness and density selected according to the required physical and air permeability properties desired of the finished nonwoven material. The density of the nonwoven material may depend, in part, on the specific gravity of any additives incorporated into the nonwoven material, and/or the proportion of the final nonwoven material that the additives constitute. Bulk density generally is a function of the specific gravity of the SFR and the porosity of the nonwoven material produced from the SFR, which can be considered to represent the packing density of the fibers in the SFR.

A low density nonwoven material may be designed to have a low density, with a finished thickness of at least about 1.5 mm and less than about 350 mm. The thickness may alternatively be at least about 4 mm and less than about 250 mm, at least about 5 mm and less than about 150 mm, at least about 6 mm and less than about 75 mm, or at least about 8 mm and less than about 50 mm. According to some of these embodiments, the nonwoven material may be formed as a relatively thick, low density nonwoven, with a bulk density of at least about 10 kg/m$^3$ and less than about 200 kg/m$^3$, or at least about 15 kg/m$^3$ and less than about 100 kg/m$^3$, or at least about 20 and less than about 60 kg/m$^3$. The SFR nonwoven material thus formed may have an air flow resistivity of at least about 400 Rayls/m and less than about 200,000 Rayls/m. Alternatively, the SFR nonwoven material may have an air flow resistivity of at least about 800 and less than about 150,000 Rayls/m, or at least about 1,000 and less than about 100,000 Rayls/m. Low density nonwoven materials may have an air flow resistivity of up to 275,000 Rayls/m.

In order to produce a low density nonwoven material, in some embodiments, it may be desirable not to compress the short fiber layer when heating it to produce the nonwoven material.

According to some other embodiments, the nonwoven material may be formed with a relatively high density and/or exhibit a relatively high air flow resistance. Such a nonwoven material may be formed to have a thickness of at least about 0.1 mm and less than about 5 mm, though it is contemplated that these high density materials may have greater thicknesses (e.g., greater than about 20 mm). The thickness may alternatively be at least about 0.25 mm and less than about 4 mm, or at least about 0.3 mm and less than about 3 mm, or at least about 0.4 mm and less than about 2.5 mm. Certain applications may require thicker materials, such as for wall paneling, for example. A nonwoven material formed in such a manner may have a bulk density of at least about 200 kg/m$^3$ and less than about 1,000 kg/m$^3$. The bulk density may be as high as 2000 kg/m$^3$. Alternatively, the bulk density may be at least about 250 kg/m$^3$ and less than about 800 kg/m$^3$, or possibly at least about 300 and less than about 600 kg/m$^3$.

The high density nonwoven material may be formed to have an air flow resistivity of at least about 275,000 Rayls/m and less than about 3,000,000 Rayls/m. Alternatively, the air flow resistivity may be at least about 1,000,000 Rayls/m and less than about 1,500,000 Rayls/m, or at least about 1,250,000 Rayls/m and less than about 1,400,000 Rayls/m. For example, a 3 mm thick material may have an air flow resistance of 6,000 Rayls if the air flow resistivity is 2,000,000 Rayls/m, or 3,000 Rayls at 1,000,000 Rayls/m, or 2,100 Rayls at 700,000 Rayls/m. Each of these exemplary materials may constitute a very effective acoustic material under certain circumstances, and the SFR should be selected so as to provide the correct range of air flow resistivity.

Other embodiments relate to a nonwoven material that is formed according to the described methods and/or having the physical and material properties described herein.

Further embodiments relate to bulk recycled fiber material comprising short fibers formed from waste material comprising thermoplastic fibers. The short fibers are formed to generally have a length of at least about 0.5 mm to less than about 12 mm, or at least about 1 mm to less than about 6 mm. Alternatively, the average fiber length of the short fibers may be less than about 12 mm, less than about 6 mm, or at least about 2 mm to less than about 5 mm. The short fibers may comprise a polyester material, such as a polyethylene terephthalate (PET) material, for example. The waste material may comprise an off-cut (e.g., material remaining after initial forming/cutting of an article) of a thermally bonded nonwoven material, for example. The short fibers may be formed by shredding the off-cuts to an intermediate length and then granulating them to produce the short fibers. Powder and dust particles may be removed from the shredded and granulated material, if necessary, with conventional dust or powder extraction processes, for example using a cyclonic separation system. In some embodiments, the fine particles may be a desirable addition to the SFR, as they may act as filler that reduces porosity and results in a useful increase in air flow resistivity.

Embodiments of the nonwoven material, including embodiments which are a TSFNW material, as described herein, are intended to be suitable for (but not limited to) use as sound attenuation materials in vehicles, attenuating sound originating from outside a cabin of a motor vehicle and propagating toward the inside of the cabin. The nonwoven material may be used in the engine cavity of the vehicle, on the inner and outer dash panels and under the carpeting in the cabin, for example. The nonwoven material may be used as interior decorative trim, in which case it may be necessary to face the acoustic sheet with some form of decorative fabric or other covering. The acoustic sheets may be used either with an air space or in combination with other sound absorption materials, for example.

The nonwoven material may also be useful as an acoustic pin board material, or as a ceiling tile, possibly in conjunction with an additional high density, or high flow resistivity facing that acts as a porous limp sheet, or flow resistive screen, for example. Furthermore, some embodiments of the nonwoven material as described herein are intended to be suitable for (but not limited to) use as filtration materials.

In some embodiments, wherein the nonwoven material is a low density nonwoven material, the nonwoven material may be used as a porous bulk absorber. In order to form a porous bulk absorber of the desired dimensions, once the nonwoven material is formed the nonwoven material may be vertically lapped and thermally bonded. Some other embodiments relate to high density nonwoven materials that may be used for a variety of applications, such as, for example, a porous limp sheet. The low and high density nonwoven materials may be used together to form composite materials or products.

In general, nonwoven materials used for sound absorption and for filtration must exhibit known air permeability properties. For instance, the sound absorption properties of porous materials have been well defined. Critical characteristics include air flow resistance (resistance to air flow through the material), tortuosity (the path length of a sound wave within the material), and porosity (void to volume ratio). With fibrous materials, air flow resistance is the overwhelmingly critical factor controlling sound absorption. The factors influencing filtration are essentially the same.

Air flow resistance is measured for a particular material at a particular thickness. The air flow resistance is normalized by dividing the air flow resistance (in Rayls) by the thickness (in meters) to derive the air flow resistivity measured in Rayls/m. ASTM standard C522-87 and ISO standard 9053 refer to the methods for determination of air flow resistance for sound absorption materials. Within the context of the described embodiments, air flow resistance, measured in mks Rayls, will be used to specify the air flow resistance; however other methods and units of measurement are equally valid. Within the context of the described embodiments, air flow resistance and air flow resistivity can be assumed to also represent the specific air flow resistance, and specific air flow resistivity, respectively.

When utilized for filtration purposes, the nonwoven material should have a relatively open structure that provides a low resistance to air flow, to minimize pressure drop through the material, while allowing for pore sizes suitable for the capture of specific particulate sizes and quantities. Acoustic materials for sound absorption may have a relatively high air flow resistance to present acoustic impedance to the sound pressure wave incident upon the material. In both applications, air permeability should be managed to ensure predictable and consistent performance and this is achieved through management of fiber sizes, types and lengths, among other factors. For this reason, a homogeneous, short fiber nonwoven textile can be desirable. A SFR-based textile can be advantageous in terms of reducing cost and providing a significant environmental benefit by reducing or eliminating the amount of waste disposed to landfill.

The use of shorter fibers has advantages in relation to the performance of the nonwoven material. The selected air flow resistivity achieved using short fibers may be significantly higher than the air flow resistivity of a conventional nonwoven material comprising substantially only conventional staple fibers having a long length of, for example, from at least about 30 mm and less than about 100 mm. Without being limited by theory, it is believed that this unexpected increase in air flow resistance may be attained as a result of the short fibers being able to pack more efficiently (e.g., more densely) in the nonwoven material than long fibers. The shorter length may reduce the degree of disorder in the packing of the fibers as they are dispersed onto a surface, such as a conveyor, or into a preformed web during production. The more ordered packing of the fibers in the material may in turn lead to an increase in the air flow resistivity. In particular, the improvement in fiber packing may achieve a reduced interstitial space in between fibers of the nonwoven material to create a labyrinthine structure that forms a tortuous path for air flow through the material, thus providing a selected air flow resistance, and/or selected air flow resistivity. Accordingly, it may be possible to produce comparatively lightweight nonwoven materials without unacceptably sacrificing performance.

Furthermore, the more effective packing of the shorter fibers may allow pore size to be more readily controlled in order to achieve desirable filtration characteristics. Pore size is a key characterizing feature of filtration materials as it determines the ability of the material to filter the relevant substances for a particular application. Furthermore, pore size is one of the factors influencing the pressure drop that occurs across filter media in use.

In some embodiments, desirable levels of air permeability may be achieved by combining plural nonwoven materials of differing densities together to form a composite product. In acoustic applications, the combination of materials having low permeability with those having high permeability can be used to achieve locally reactive acoustic behavior. In such embodiments, one or more of the nonwoven materials may be SFR-based materials in accordance with embodiments described herein.

Composite products may be formed from SFR-based porous limp sheets with relatively high air flow resistances, and SFR-based porous bulk absorbers or spacer materials having air flow resistances substantially smaller than the limp sheets. Methods for producing such composite products include those set out in co-owned International Application No. PCT/AU2005/000239 entitled "Thermoformable Acoustic Product" (published as WO/2005/081226), the contents of which is hereby incorporated herein by reference.

Figure 2:
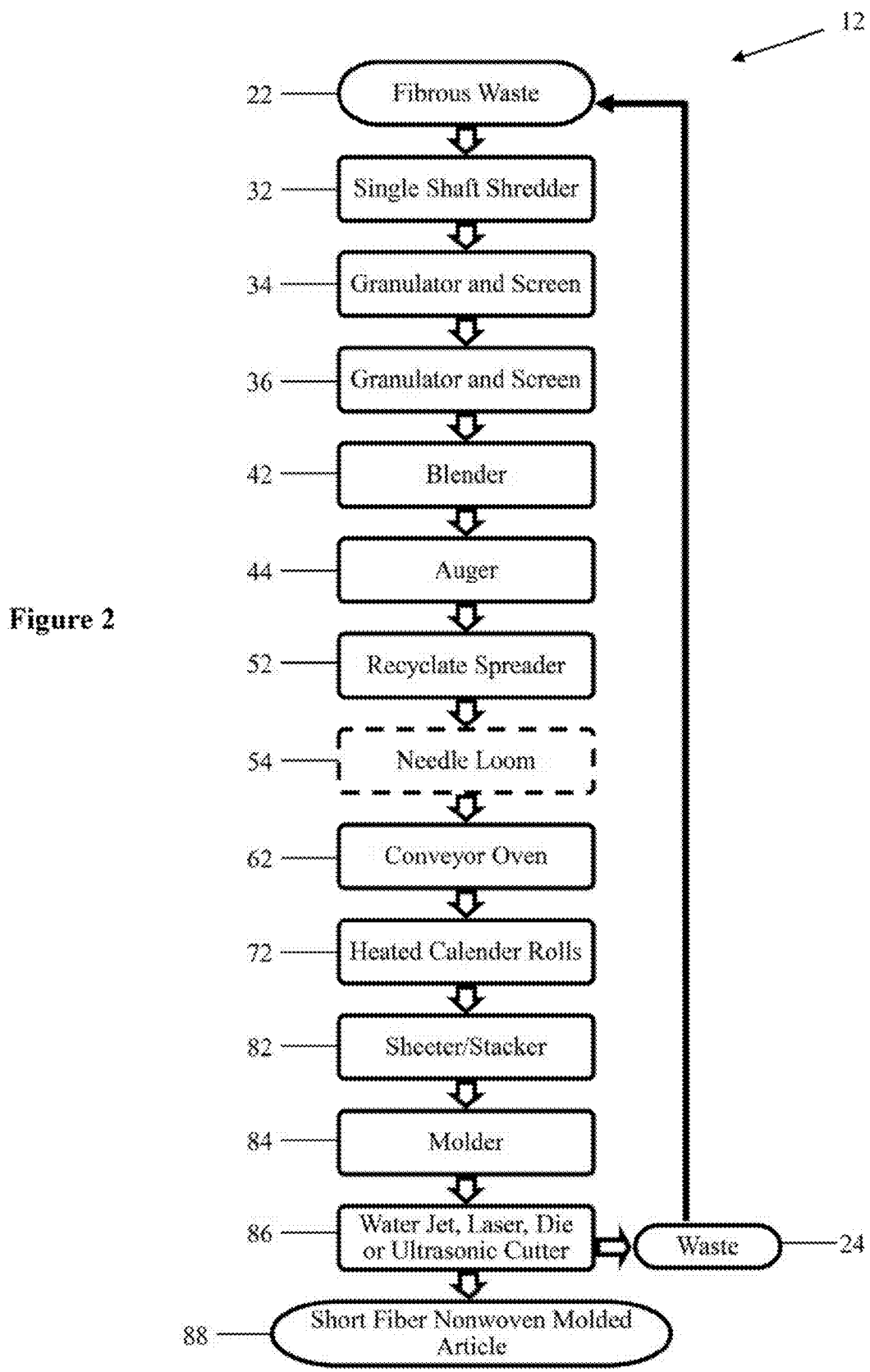
FIG. 2 is a flowchart illustrating an exemplary processing sequence for forming a short fiber nonwoven article and reusing the waste.

Referring now to FIGS. 1 and 2, there is shown a flowchart of an exemplary general process 10 for forming a nonwoven material suitable for use as an acoustic sheet and a more detailed exemplary processing system 12 to produce a short fiber nonwoven molded article and reusing the waste. The general process 10 begins with the step of obtaining fibrous waste 20, and this waste 22 will be processed to form a blank. A size reduction step 30 turns the fibrous waste 22 into short fibers. In the exemplary processing system 12, the fibrous waste 22 passes through a single shaft shredder 32, which makes the first rough size reduction and produces shredded fibers. A single shaft shredder may be advantageous as it is capable of processing large and/or hard, highly compacted parts of fibrous waste 22. Also in the size reduction step 30, the shredded fibers may be sent through at least one granulator. In the exemplary processing system 12 of FIG. 2, the shredded fibers are sent through two granulators 34 and 36 with screens, which are arranged in series, to further reduce the average size or length of the shredded fibers. The granulators 34 and 36 may each have a cutting chamber with fixed and rotating blades and a screen at the bottom that allows the material to pass through once it reaches a particular size. It is preferred that the first granulator 34 has a screen with larger openings than the screen of the second granulator 36 to allow the fibers to be further reduced in size after each pass through a granulator 34, 36. The desired product from the second granulator 36 is short fibers, and the short fibers may be close to a powder, preferably with an average fiber length of at least about 1 mm and less than about 5 mm (e.g., at least about 2 mm and less than about 3 mm).

Following the size reduction step 30 is a blending step 40. As fibrous wastes can be processed individually or separately based upon the size or type of waste, a mixing device such as a mixer or blender 42 provides the ability to combine short fiber products and allows for different recyclate streams to be processed individually before mixing. Additives may also be added to the short fibers, for example by blending or mixing, if necessary or desirable, to treat or supplement the short fibers prior to a web formation step 50. Such additives may include, but are not limited to: antimicrobial substances; flame-retardant substances; thermoplastic resins; thermoset resins; mineral fillers; adhesive powders; and further staple fibers, including thermoplastic adhesive staple fibers. Additives may be combined with the short fibers in the blender 42. If further staple fibers, such as virgin fibers, are added, the processing system 12 may further comprise bale openers for opening the bales of bulk staple fibers and placing them in a feed hopper. The virgin fibers are then fed into the blender 42. The blending step 40 also preferably ensures that the various components and additives are relatively evenly blended throughout the mixture. For thermoformable acoustic sheet applications, the short fiber mixture may contain about 40% polypropylene (PP) and about 60% polyethylene terephthalate (PET), though other proportions and materials are possible. The PP has a lower melting point than PET and other possible fibers and can serve as a binder in a fusion step 60. Once the short fibers are blended, they may be conveyed by an auger 44 to the next step in the system.

At the web formation step 50, the short fiber mixture, together with any additives, is formed into a web, for example by scattering, mechanical forming, or air laid processes. In this step in the exemplary embodiment of FIG. 2, the blended short fiber mixture is conveyed by the auger 44 to a recyclate spreader 52, which evenly deposits the short fiber mixture onto a carrier to create a short fiber web. Using the recyclate spreader 52 helps to distribute the short fiber mixture with a consistent weight per unit area, preferably onto a facing material. This facing material may be a nonwoven, preformed web; fabric; needle-punched material; or other nonwoven material, such as a scrim. For some thermoformable acoustic sheet applications, it is preferred that the facing material consist of approximately 200 g/m² needle punched polyester nonwoven. Additionally it may also include a proportion of polyester bi-component fiber. Previously, distributing short fibers was difficult because of clumping of the mixture. In the exemplary process system 12, however, the recyclate spreader 52 reduces clumping by reducing the static charge of the fiber mixture. Following the scattering of the short fiber mixture, it is possible to have a second facing material placed on top of the short fiber web. This facing material may be the same material as the facing material beneath the short fiber web or another material, such as a fabric, needle punched material or other type of nonwoven material. Therefore, if a second facing material is introduced, it is contemplated that the short fiber web is in the center, sandwiched between two facing sheets. As FIG. 2 indicates, if a second facing material is introduced, optional equipment such as a needle loom 54 can be used to mechanically attach the two facing materials together prior to a fusion step 60, though in some applications, the heating and compacting steps sufficiently join the facing materials without requiring mechanical attachment.

In the fusion step 60, the short fiber web is transported to a conveyor oven 62. It is preferable that the short fiber web contains bi-component fibers, low melt fibers, low melt temperature powder or granules, or a combination, which allows the material to be fused together when heated in the conveyor oven 62. As the short fiber web is transported through the conveyor oven 62, the low melt fibers will soften and fuse or bind the short fiber web together. It is recommended that a facing material, such as a needle punched fabric or a nonwoven fabric such as a scrim, be beneath the short fiber web to transport the short fiber web through the conveyor oven 62.

Figure 3:
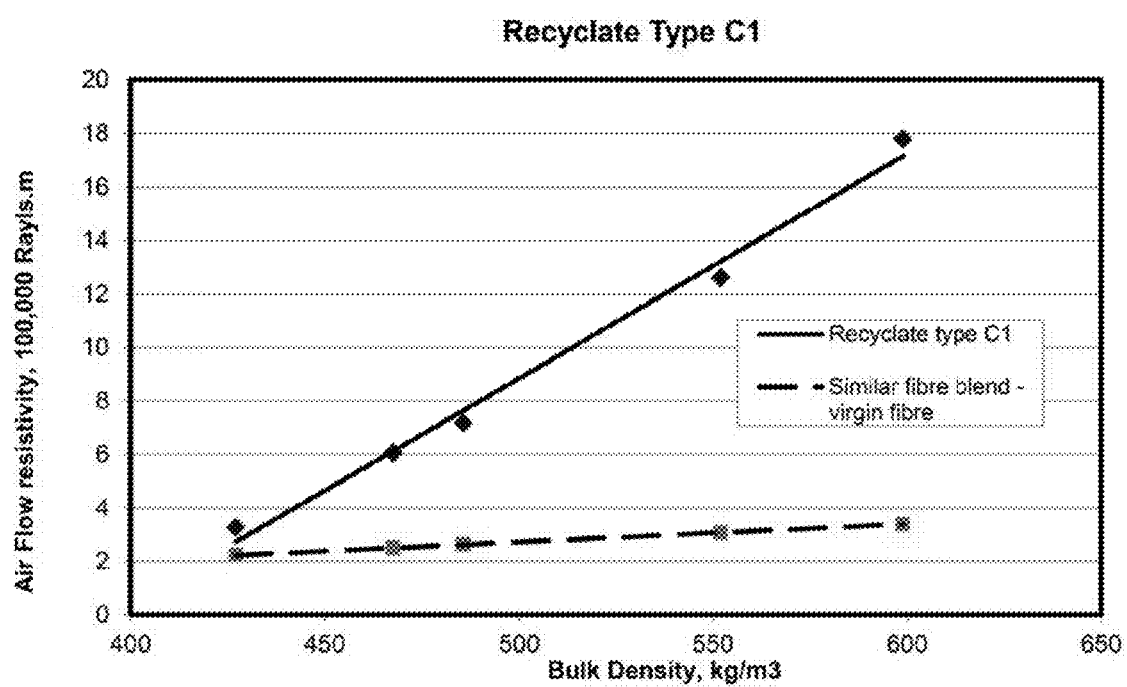
FIG. 3 is a graph showing air flow resistivity (Rayls/m) vs. bulk density ($kg/m^3$) with a short fiber nonwoven article containing bicomponent adhesive fiber as the adhesive component.

Following the fusion step 60, the web and facing material are preferably compacted in a compaction step 70. This compaction step 70 may be performed using a compaction unit or a laminating unit. A laminator may be used; however, for certain purposes, a typical laminator may not have the capability of sufficiently compressing the material. For these instances where the material must be compressed beyond the capability of a laminator, it is possible to use a compaction unit, such as a set of heated calender rolls 72. Since the density of the material impacts the air flow resistivity, as is shown in FIG. 3, for acoustic materials in sound absorption applications, the compaction step 70 improves the performance of the finished product.

After compaction, a blank is formed in a blank formation step 80. The material may be wound into rolls or cut into sheets by a rewind mechanism or sheeter/stacker 82 for later use in a desired application. If the material is to be a particular shape, like for a thermoformable acoustic sheet, after the material is cut with a sheeter/stacker 82, the sheet may be shaped by a molder 84. After being molded, the desired shaped portion of the sheet is removed, for example by a water jet, laser, die, or ultrasonic cutting machine 86. Further assembly of the molded parts, such as by gluing or welding, may be required depending on the product, and the final product is a short fiber nonwoven molded article 88. When the molded portion of the sheet is removed, the trim material, or waste 24, is left behind. This waste 24 often becomes waste, particularly when molding thermoformable acoustic sheets, and it is typical in such applications that about 50% of the blank is wasted. Previously, it was thought that this waste could not be reused without substantial further processing to separate the waste into its component parts, such as through a melting step. However, an advantage of the process outlined herein is that the waste 24 can be reused, rather than scrapped, and it can be recycled into the process in the obtaining waste step 20 as fibrous waste 22 without a melting or disambiguation step.

As shown in FIG. 2, the waste 24 can be reused as new waste 22 in the beginning of a subsequent exemplary process system 12. As discussed above, it was previously understood that the waste had to be melted down to be recycled. However, with the described exemplary process, the waste re-enters the process at the waste obtaining step 20, and it is reprocessed into short fibers in the size reduction step 30, preferably passing through the single shaft shredder 32 and granulators with screens 34, 36, without requiring additional steps outside of the exemplary process 12.

When the waste re-enters the exemplary process system 12 as waste 22, it comprises approximately 28% PP. While it is possible to create subsequent short fiber nonwoven molded articles 88 at this level of PP, it is preferable that more PP is added to the process, for example, in the blending stage 40, so the PP level is at the most preferable level of approximately 40%.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

What is claimed is:

1. A method of forming a nonwoven article, the method comprising:
   a) receiving fibrous material comprising thermoplastic fibers, wherein at least a portion of the fibrous material is waste material;
   b) processing the fibrous material to produce short fibers, wherein the processing step comprises granulation utilizing at least one granulator with a screen;
   c) distributing the short fibers approximately evenly across an area to form a short fiber web, wherein the distributing step comprises using a recyclate spreader that reduces clumping of the short fibers by reducing the static charge of the short fibers;
   d) heating the short fiber web to fuse the short fibers to form a nonwoven material;
   e) forming a sheet of the nonwoven material; and
   f) molding the sheet of the nonwoven material into a molded article having a three-dimensional shape wherein the molded article is suitable for use as a sound absorption material.

2. The method of claim 1, wherein the short fibers are blended before the distributing step to achieve a relatively consistent distribution of fibrous material.

3. The method of claim 1, wherein the distributing step distributes the short fibers approximately evenly onto a facing material.

4. The method of claim 3, wherein the facing material is formed of a non-woven preformed web, needle punched material, fabric, or combination thereof.

5. The method of claim 3, wherein a second facing material is placed on top of the short fiber web after the distributing step.

6. The method of claim 1, wherein the method includes a compacting step to achieve a desired density of the nonwoven material.

7. The method of claim 6, wherein the compacting step comprises using at least one set of heated calendar rolls.

8. The method of claim 1, wherein the nonwoven material exhibits selected air flow resistivity of about 275,000 Rayls/m to about 3,000,000 Rayls/m.

9. The method of claim 1, wherein the molded article is surrounded by waste.

10. The method of claim 9: wherein the molded article is separated from the waste.

11. The method of claim 10, wherein the molded article is separated from the waste with a water jet, laser, die, or ultrasonic cutter.

12. The method of claim 10, wherein the waste is recycled at the receiving step.

13. The method of claim 1, wherein the processing step includes shredding with a single shaft shredder before the at least one granulator with the screen.

14. The method of claim 1, wherein the processing step comprises granulation with two or more granulators arranged in series, with each granulator having at least one screen.

15. The method of claim 1, wherein the short fibers after the processing step have an average length of about 2 mm to about 3 mm.

16. The method of claim 1, wherein the heating step comprises a con oven to soften low-melt temperature short fibers and bond the short fibers together.

17. A method of forming a nonwoven article, the method comprising:
   a) receiving fibrous material comprising thermoplastic fibers;
   b) processing the fibrous material to produce short fibers, wherein the processing step comprises granulation using at least one granulator with a screen;
   c) blending the short fibers achieve a relatively consistent distribution of fibrous material;
   d) distributing the short fibers approximately evenly to form a short fiber web on a facing material, wherein the distributing step comprises use of a recyclate spreader;
   e) heating the short fiber web and the facing material in an oven to form a nonwoven material;
   f) compacting the nonwoven material,
   g) forming a sheet of the nonwoven maternal;
   h) shaping the sheet of nonwoven material into a molded article surrounded by waste;
   i) separating the molded article from the waste; and
   j) recycling the waste into the receiving step without performing melting or disambiguation steps prior to the receiving step,
   wherein the nonwoven material is suitable for use as a sound absorption material, and
   wherein the nonwoven, material exhibits a selected air flow resistivity of about 275,000 Rayls/m to about 3,000,000 Rayls/m.

18. The method of claim 17, wherein a second facing material is placed on top of the short fiber web after the distributing step.

19. The method of claim 17, wherein the compacting step comprises using at least one set of heated calendar rolls.

20. The method of claim 1, wherein the waste material does not undergo melting or disambiguation steps prior to the receiving step.

* * * * *

UNITED STATES PATENT AND TRADEMARK OFFICE
CERTIFICATE OF CORRECTION

PATENT NO.       : 9,546,439 B2
APPLICATION NO.  : 14/277953
DATED            : January 17, 2017
INVENTOR(S)      : Michael William Coates et al.

Page 1 of 1

It is certified that error appears in the above-identified patent and that said Letters Patent is hereby corrected as shown below:

In the Claims

Column 18, Line 11, delete "heated calendar rolls" and insert --heated calender rolls--

Column 18, Line 36, delete "comprises a con oven" and insert --comprises a conveyor--

Column 18, Line 45, insert --to-- after "the short fibers"

Column 18, Line 52, delete "material," and insert --material;--

Column 18, Line 53, delete "nonwoven maternal" and insert --nonwoven material--

Column 18, Line 62, delete "," after "the nonwoven"

Column 19, Line 2, delete "heated calendar rolls" and insert --heated calender rolls--

Signed and Sealed this
Eighteenth Day of April, 2017

Michelle K. Lee
*Director of the United States Patent and Trademark Office*